United States Patent [19]
Udagawa et al.

[11] Patent Number: 4,603,898
[45] Date of Patent: Aug. 5, 1986

[54] APPARATUS FOR INHIBITING FOREIGN MATERIAL FROM BEING DEPOSITED ON REAR WINDOW OF A MOTORCAR

[75] Inventors: Masakazu Udagawa, Fujimi; Masaaki Saito, Wako; Shingo Segawa, Kawagoe; Masahiro Noda, Tokyo, all of Japan

[73] Assignee: Honda Giken Kogyo Kabushiki Kaisha, Tokyo, Japan

[21] Appl. No.: 643,520

[22] Filed: Aug. 23, 1984

[30] Foreign Application Priority Data

Aug. 24, 1983 [JP] Japan ............................ 58-130913[U]
Aug. 24, 1983 [JP] Japan ............................ 58-130915[U]
Aug. 24, 1983 [JP] Japan ............................ 58-130918[U]

[51] Int. Cl.$^4$ ............................................. B62D 37/02
[52] U.S. Cl. ................................... 296/91; 15/250 R
[58] Field of Search ............... 296/91, 1 S; D12/181; 15/250 R

[56] References Cited

U.S. PATENT DOCUMENTS 3,059,562 10/1962 Sturtevant et al. ................. 296/91
3,799,603 3/1974 Bott .................................... 296/91
4,339,145 7/1982 Bott et al. .......................... 296/91
4,441,752 4/1984 Buehrig ............................. 296/91

*Primary Examiner*—Robert R. Song
*Attorney, Agent, or Firm*—Armstrong, Nikaido, Marmelstein & Kubovcik

[57] ABSTRACT

An apparatus for inhibiting foreign material from being deposited on a rear window of a motorcar essentially comprising a first inclined air introduction surface extending in a rearward and downward direction from a rear laterally middle part of an upper surface of a body roof, a second inclined air introduction surface formed on a laterally middle part of a rear window frame of a rear gate or the like fitted to the car body and extending rearwardly from the first inclined air introduction surface in a continuous and flush manner and an air flow control plate fixedly mounted on the second inclined air introduction surface on the rear window frame so as to allow air introduced into both the first and second inclined air introduction surfaces to flow along an upper surface of a rear windshield fitted to the rear window frame, wherein the upper surface of the air flow control plate is located flush with the upper surface of the body roof and an upper surface of the rear window frame.

33 Claims, 14 Drawing Figures

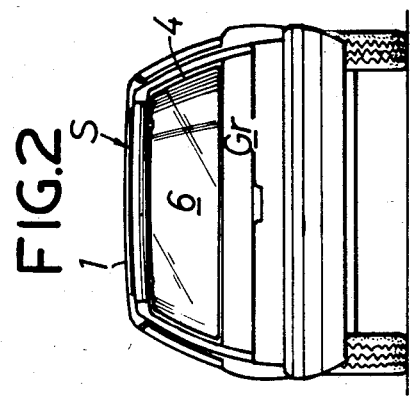
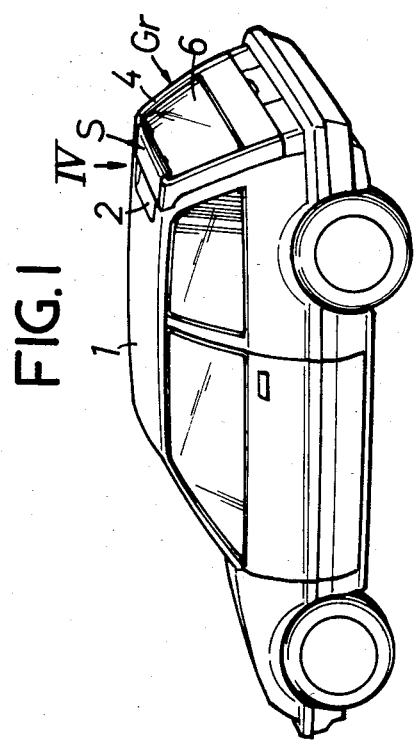

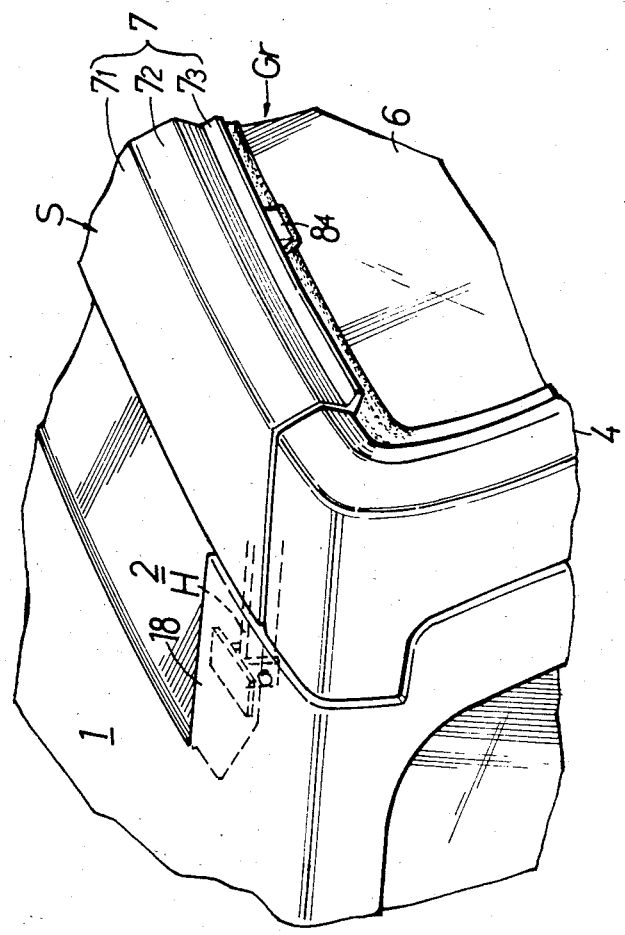

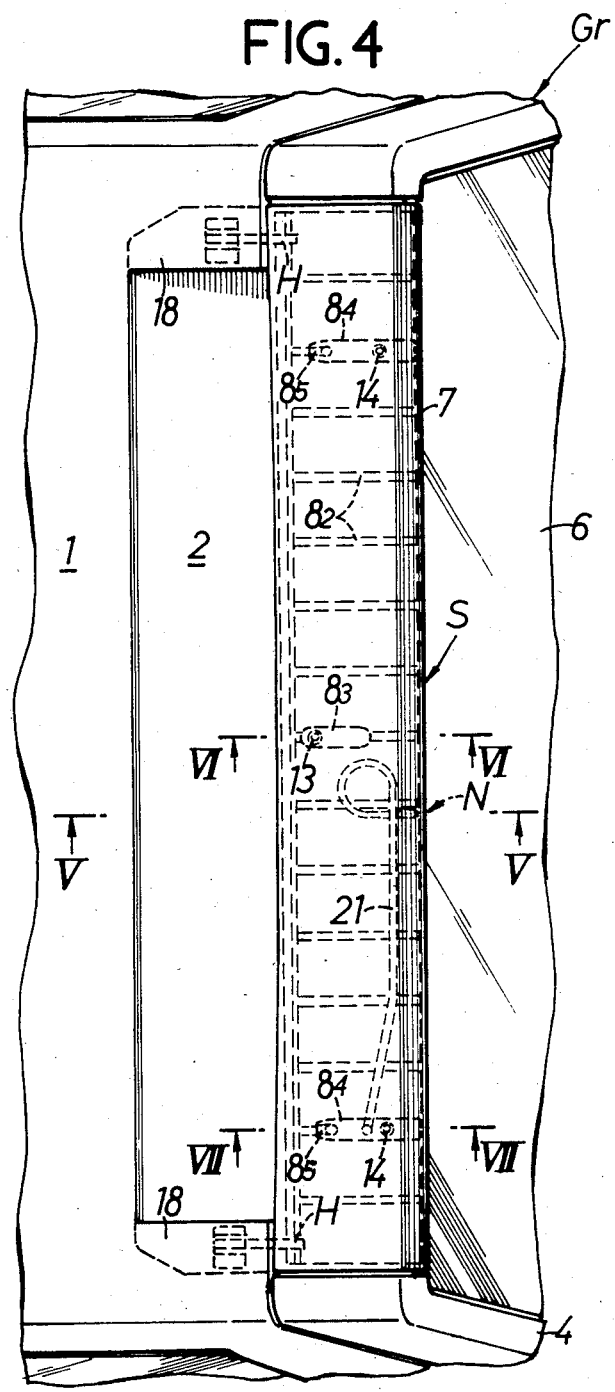

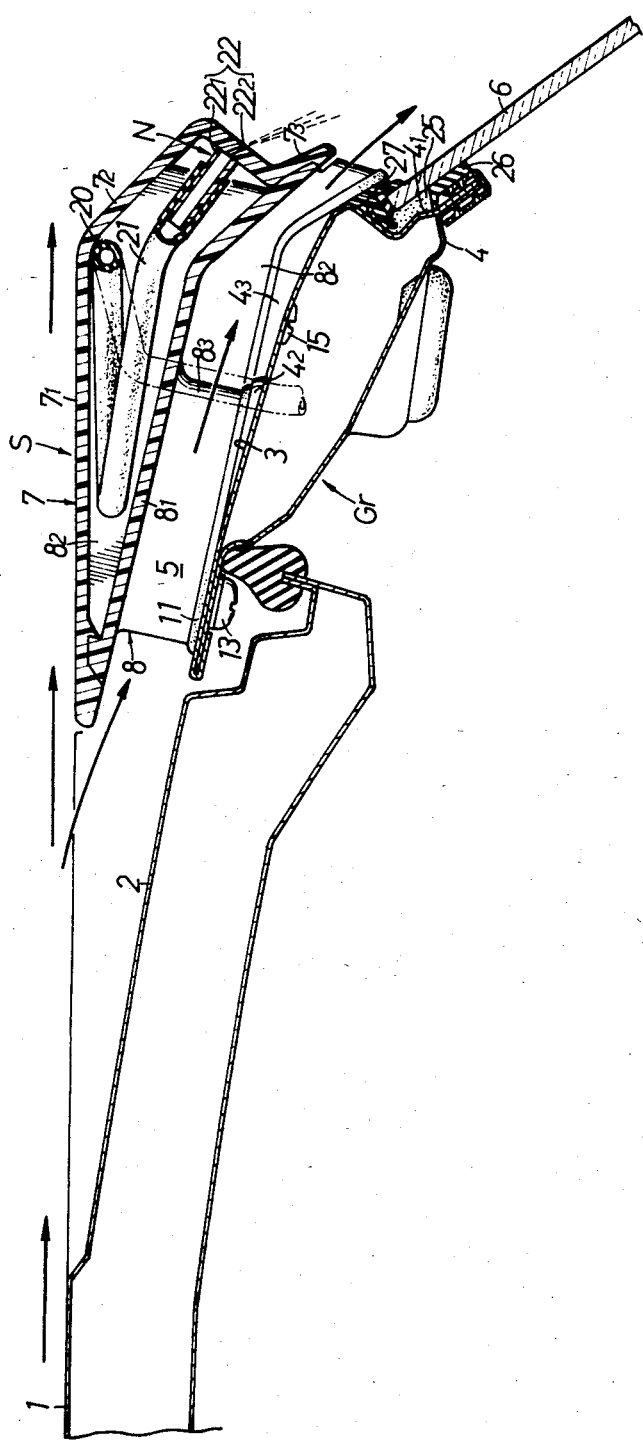

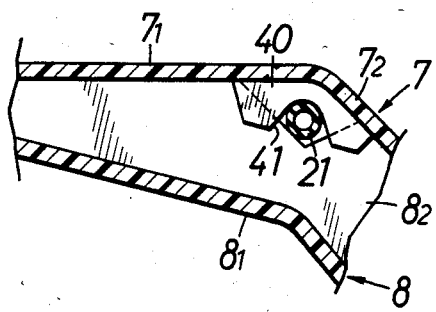
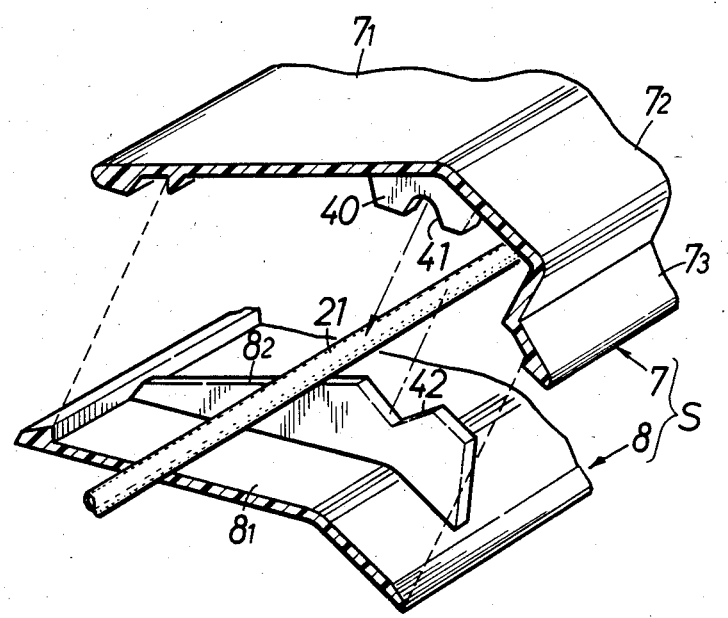

APPARATUS FOR INHIBITING FOREIGN MATERIAL FROM BEING DEPOSITED ON REAR WINDOW OF A MOTORCAR

BACKGROUND OF THE INVENTION

1. Field of the Invention

The present invention relates to an apparatus for inhibiting foreign material from being deposited on the rear window of a motorcar and more particularly to an apparatus for inhibiting foreign material such as mud, dust or the like on the rear window of a motorcar by allowing air flowing along the upper surface of the car body during movement of the motorcar to be introduced toward the rear window frame to flow along the upper surface of the latter and moreover effectively cleaning the rear windshield.

2. Description of the Prior Art

As is well known, when a motorcar runs on road or ground in the rain or it travels on muddy road even in fine weather, foreign material such as mud sprashed up by rear wheels, dust or the like tends to be deposited on the rear window. Thus deposited foreign material causes a driver to observe rear sight through the rear windshield with much difficulties and moreover it degrades the car appearance.

To obviate the foregoing problem there was proposed mounting of an air flow control plate on the rear part of the upper surface of a car body as disclosed in Japanese Utility Model Laid-Open No. 40266/73. The conventional air flow control plate is intended to introduce air flowing along the body roof toward the rear window therethrough so as to allow it to flow further along the upper surface of that window for the purpose of inhibiting foreign material such as mud, dust or the like from being deposited on the rear windshield.

However, it is pointed out as a drawback inherent to the conventional air flow control plate that since the air flow control plate is projected upwardly of the body roof, there occurs increase in projected area as seen from the front side, resulting in increased air resistance during travelling of a motorcar.

On the other hand, to clean a windshield fitted to the rear window a windshield cleaning apparatus is already proposed which has a cleaning nozzle fixedly disposed at the rear upper part of the car body to spray cleaning liquid toward the upper surface of the rear windshield from the nozzle to clean it. In such conventional cleaning apparatus, if the amount of upward projection of the cleaning nozzle from the upper surface of the car body is restricted to a minimum extent in view of the external appearance of a motorcar, it in turn results disadvantageously in that the nozzle is forced to have a very small spraying angle relative to the upper surface of a rear windshield to be cleaned. Accordingly, there is necessity for determining a spraying angle of the nozzle with very high accuracy in order to enable cleaning liquid to be sprayed over the upper surface of the windshield without fail. This leads to an increased production cost. Another drawback of the conventional windshield cleaning apparatus is that any minor projection of the cleaning nozzle upwardly of the upper surface of the car body degrades appearance of the whole car.

It should be noted that arrangement of the cleaning apparatus at the upper rear part of the car body inevitably raises problems of how and where to mount components other than cleaning nozzle on the body.

SUMMARY OF THE INVENTION

Hence, the present invention has been made with the foregoing background in mind.

It is therefore a primary object of the present invention to provide an apparatus for inhibiting foreign material such as mud, dust or the like from being deposited on the rear window of a motorcar, which assures that the rear window of the car body can be effectively cleaned without causing any increase in air resistance by equipment of the apparatus during travel of a motorcar.

It is another object of the present invention to provide an apparatus of the above-mentioned type, which assures that cleaning liquid can be sprayed over the upper surface of a rear windshield at a comparatively large spraying angle relative to the latter through a cleaning nozzle fitted to an air flow control plate which is fixedly mounted on the rear upper part of a car body.

It is other object of the present invention to provide an apparatus of the above-mentioned type wherein the cleaning nozzle has no portion projecting upwardly of the upper surface of the car body and which is simple in structure and therefore can be produced at an inexpensive cost.

It is a further object of the present invention to provide an apparatus of the above-mentioned type, wherein components constituting the apparatus, particularly, the cleaning mechanism can be located advantageously.

To accomplish the above objects there is proposed according to an aspect of the invention an apparatus for inhibiting foreign material from being deposited on the rear window of a motorcar, which comprises a first inclined air introduction surface extending downwardly in the rearward direction from a laterally middle part of the rear upper surface of the body roof, a second inclined air introduction surface extending continuously and flush with the first air introduction surface in the rearward downward direction at a laterally middle part of the upper surface of the rear window frame and an air flow control plate fixedly mounted on the second inclined air introduction surface on the rear window frame so as to allow air as flowing on both the first and second inclined air introduction surfaces to flow further along the upper surface of a rear windshield fitted to the rear window frame, wherein the upper surface of the air flow control plate is located flush with the upper surface of the body roof and the upper surface of the rear window frame.

Further, there is proposed according to another aspect of the invention an apparatus for inhibiting foreign material from being deposited on the rear window of a motorcar, which comprises a first inclined air introduction surface extending downwardly in the rearward direction from a laterally middle part of the rear upper surface of the body roof, a second inclined air introduction surface extending continuously and flush with the first air introduction surface in the rearward downward direction at a laterally middle part of the window frame fitted to a rear gate on the car body and an air flow control plate fixedly mounted on the second inclined air introduction surface on the window frame so as to allow air as flowing on both the first and second inclined air introduction surfaces to flow further along the upper surface of a windshield fitted to the window frame, wherein the upper surface of the air flow control plate is located flush with the upper surface of the body roof and the upper surface of the window frame.

According to the invention, a cleaning nozzle directed toward the upper surface of a windshield fitted to the rear window frame is disposed at a rear end part of the air flow control plate.

Further, according to the invention, a plurality of legs are provided on the air flow control plate and are fixedly secured to the upper surface of the car body and a cleaning hose which is in communication with the cleaning nozzle is extended through the legs without making an obstacle to function of the air flow control plate so as to lead to a cleaning liquid supply source.

Further, according to the invention, the air flow control plate comprises an upper half and a lower half which are separately molded of synthetic resin and thereafter are bonded together to form a unit, and the cleaning hose is immovably held between both the upper and lower halves so that any occurrence of inconveniences such as disconnection of the hose from the cleaning nozzle due to vibrations of the car body, generation of noise due to collision of the hose against the air flow control plate, or damage on the hose can be avoided. With this arrangement, there is required no specially designed holding member, clamping means or the like so that mounting of the hose is facilitated, the number of components is reduced and the cost is lowered as a whole.

Further, according to the invention, a washer tank used for reserving cleaning liquid is formed in a part of the interior space obtained in the air flow control plate. Thus, there is no necessity for designing a cleaning liquid reservoir section in the form of a separate container or securing a space for housing such a container as mentioned above in a certain component of the car body such as door, pillar, bonnet or the like as is often seen in the conventional apparatus. This means that the washer tank can be designed so as to have a required capacity without suffering from any spatial restriction. Further, since there is no necessity for preparing support members which are required when the washer tank is designed in the form of a separate container, the apparatus can be produced without particular increase in production cost therefor.

Further, according to the invention, the rear end parts of the legs on the air flow control plate are extended to abut the upper end edge of the rear windshield so that they can serve as temporary holding means for inhibiting the rear windshield from being undesirably moved from its mounted position in the frame until adhesive applied for fixing the windshield to the rear window frame during the assembling step of car body is completely solidified. Thus, there is no necessity for preparing any specially designed clip or the like means which is conventionally employed for the same purpose and therefore securing step for the rear windshield can be facilitated and simplified.

The above and other objects, features and advantages of the invention will become apparent from reading of the following description taken in conjunction with the accompanying drawings.

BRIEF DESCRIPTION OF THE DRAWINGS

The accompanying drawings will be briefly described below.

FIGS. 1 to 9 illustrate an apparatus in accordance with a first embodiment of the invention, wherein:

FIG. 1 is a perspective view of a motorcar with an apparatus of the invention mounted thereon, as seen from the rear side;

FIG. 2 is an elevation of the motorcar in FIG. 1 as seen from the back side;

FIG. 3 is a fragmental perspective view of the motorcar in FIG. 1, shown in an enlarged scale;

FIG. 4 is a fragmental plan view of the motorcar as seen in the direction as identified by an arrow mark IV in FIG. 1;

FIG. 5 is a fragmental sectional view of the motorcar taken in line V—V in FIG. 4, shown in an enlarged scale;

FIG. 6 is a fragmental sectional view of the motorcar taken in line VI—VI in FIG. 4, shown in an enlarged scale;

FIG. 7 is a fragmental sectional view of the motorcar taken in line VII—VII in FIG. 4, shown in an enlarged scale;

FIG. 8 is a fragmental sectional view of the motorcar as seen from the bottom in the direction as identified by an arrow mark VII in FIG. 7; and FIG. 9 is a fragmental perspective view of an air flow control plate constituting the apparatus of the invention, shown in a disassembled state.

FIGS. 10 and 11 illustrate an apparatus in accordance with a second embodiment of the invention, wherein:

FIG. 10 is a fragmental plan view of the rear upper part of a motorcar with an air flow control plate firmly secured thereto; and FIG. 11 is a fragmental sectional view of the motorcar taken in line XI—XI in FIG. 10, shown in an enlarged scale.

FIG. 12 and 13 illustrate an air flow control plate with hose holding means disposed thereon in accordance with a modified form of the first embodiment of the invention; wherein:

FIG. 12 is a fragmental sectional view of the air flow control plate with hose holding means disposed therein, and FIG. 13 is a fragmental perspective view of the air flow control plate in FIG. 12, shown in a disassembled state.

DESCRIPTION OF THE PREFERRED EMBODIMENTS

Figure 6:
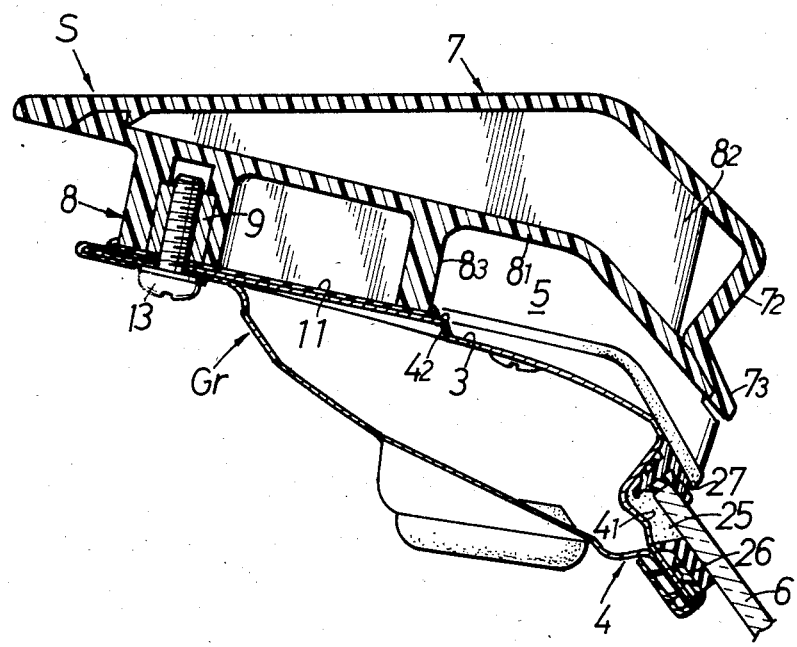

Now, the present invention will be described in a greater detail hereunder with reference to the accompanying drawings which illustrate preferred embodiments thereof. It should be noted that same or similar components shown throughout the drawings are identified by same reference numerals.

Description will be made as to an apparatus in accordance with the first embodiment of the invention with reference to FIGS. 1 to 9. A motorcar with an openable rear gate Gr fitted thereto has a first inclined air introduction surface 2 extending downwardly in the rearward direction in an area located at a rear and laterally middle part of a body roof 1 and moreover it has a second inclined air introduction surface 3 extending downwardly in the rearward direction in an area located at a laterally middle part of the rear window frame 4 of the rear gate Gr. The second inclined air introduction surface 3 extends flush with the first inclined air introduction surface 2 in a continuous fashion.

An air flow control plate S is fixedly disposed on the second inclined air introduction surface 3 and an air introduction passage 5 is defined by a combination of the first and second inclined air introduction surfaces 2 and 3 and the air flow control plate S. Thus, flowing air introduced into the introduction passage 5 is urged to flow along the outer surface of a rear windshield 6.

As clearly illustrated in FIGS. 2, 3 and 5, the upper surface of the air flow control plate S is designed to extend flush with the upper surface of the roof 1 and the upper surfaces of both the side parts of the rear window frame 4 so as to form a smooth continuation surface. Accordingly, the projected area as seen from the front side of motorcar, that is, projected area on a plane extending normal to the direction of travel of motorcar does not increase regardless of the existence of the air flow control plate S.

As is best seen in FIG. 3, hinge covers 18 are disposed on both the sides of the first inclined air introduction surface 2 at positions located flush with the upper surface of the roof 1 whereby hinge members H for the rear gate Gr are covered with the hinge covers 18. Thus, there is no fear of causing the hinge members H to degrade appearance of the body and to increase air resistance.

Figure 7:
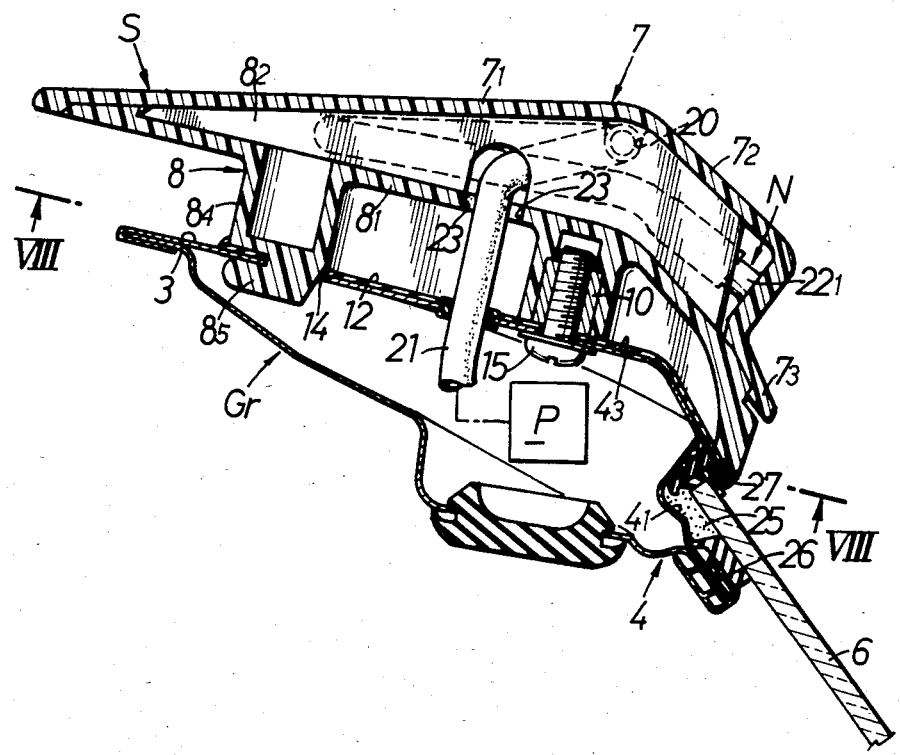
Figure 8:
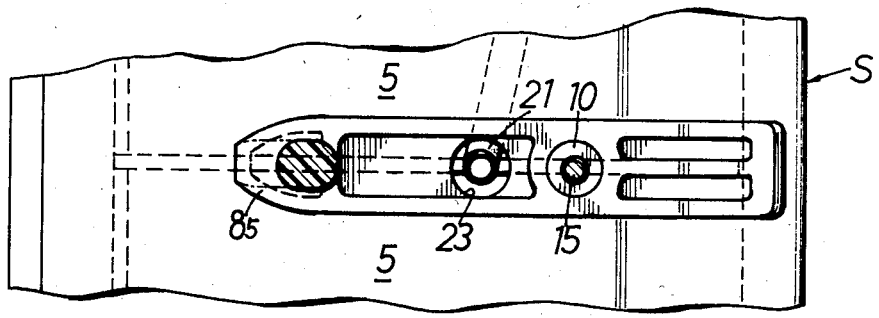
Figure 9:
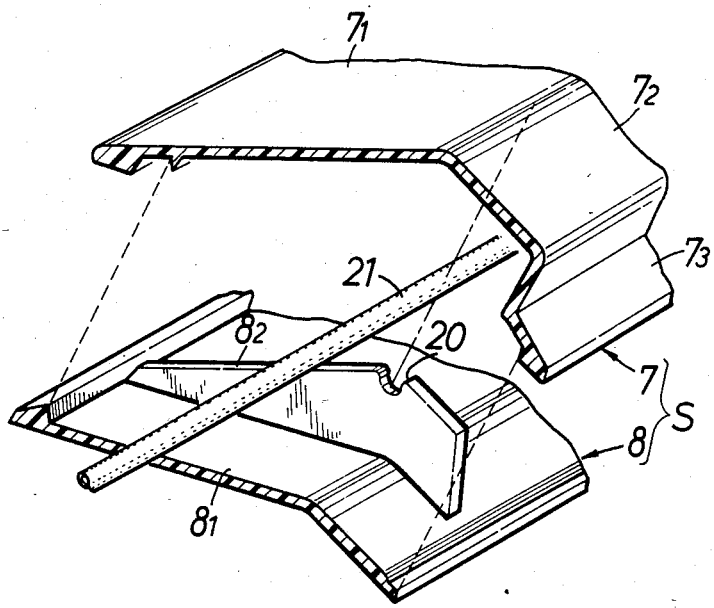

Next, description will be made in more details as to the structure of the air flow control plate S with reference to FIG. 5. As illustrated in FIG. 5, the air flow control plate S is made of two halves, that is, an upper half 7 and a lower half 8 both of which are separately molded of hard synthetic resin and then assembled one above another in the integrated structure. The upper half 7 comprises an upper wall $7_1$ extending flush with the roof 1 and the upper surfaces of both the sides of the rear window frame 4, a rear wall $7_2$ extending downwardly from the rear end of the upper wall $7_1$ while assuming the position flush with the rear surface of the rear window frame 4 and a flange end $7_3$ extending from the rear end of the rear wall $7_2$ in substantially parallel with the surface of rear windshield 6 of the rear gate Gr. These walls $7_1$, $7_2$ and end $7_3$ are molded in the form of a single wall structure. On the other hand, the lower half 8 comprises a lower wall $8_1$ extending in substantially parallel with the second inclined air introduction surface 3, a plurality of reinforcement ribs $8_2$ arranged on the lower wall $8_1$ in a spaced relation in the transverse direction, a central foot $8_3$ projecting downwardly from the lower wall $8_1$ and extending in the longitudinal direction as is best seen in FIGS. 4 and 6 and lefthand and righthand feet $8_4$ projecting downwardly from the lower wall $8_1$ and extending in the longitudinal direction by a distance longer than that of the central foot $8_3$ as is best seen in FIGS. 4 and 7. The wall $8_1$, the ribs $8_2$ and the feet $8_3$ and $8_4$ as arranged in that way are molded in the form of a single wall structure. As will be apparent from FIGS. 4 and 8, the rear ends of the pair of feet $8_4$ are located above the upper end of the rear windshield 6 fitted to the rear window frame 4 so that they serve as temporary securing means for inhibiting the rear windshield 6 from moving loosely after completion of securing operation with the use of adhesive as will be described later. The lower half 8 is fixedly secured to the lower surface of the upper half 7 and moreover the plural ribs $8_2$ are fixedly secured to the lower surfaces of the upper wall $7_1$ and the rear wall $7_2$. As illustrated in FIG. 6, the central foot $8_3$ has an insert nut 9 embedded in a front part thereof. Further, as illustrated in FIG. 7, the lefthand and righthand feet $8_4$ each have a hook-shaped tongue $8_5$ projecting forwardly from a fore part thereof, and an insert nut 10 is embedded in a rear part of each of the feet $8_4$.

Referring to FIGS. 5 to 7 again, an upwardly raised central mounting seat $4_2$ (see FIG. 6) and lefthand and righthand mounting seats $4_3$ (see FIG. 7) are provided on the second inclined air introduction surface 3 at respective positions corresponding to the central foot $8_3$ and the lefthand and righthand feet $8_4$, $8_4$ Thus, the central foot $8_3$ and the lefthand and righthand feet $8_4$, $8_4$ are placed on the central mounting seat $4_2$ and the lefthand and righthand mounting seats $4_3$ with gaskets 11 and 12 interposed therebetween. A fastening bolt 13 is screwed into the insert nut 9 in the central foot $8_3$ from the bottom through the central mounting seat $4_2$. The hook-shaped tongues $8_5$ of the lefthand and righthand mounting feet $8_4$, $8_4$ are fitted to holes 14 formed at the fore part of the lefthand and righthand mounting seats $4_3$ while fastening bolts 15 are screwed into the insert nuts 10 in the lefthand and righthand mounting feet $8_4$, $8_4$ from the bottom through the lefthand and righthand mounting seats $4_3$. As a result, the air flow control plate S can be firmly secured to the second inclined air introduction surface 3 of the rear window frame 4.

Referring to FIGS. 4 and 5 again, the air flow control plate S is provided with a cleaning liquid spraying device N which serves to spray cleaning water over the rear windshield 6. Now, description will be made as to the structure of the cleaning liquid spraying device N. A U-shaped cutout 20 is formed on the upper end of each of several reinforcement ribs $8_2$ in a laterally middle area of the air flow control plate S at a position located below the joint section where the upper wall $7_1$ and the rear wall $7_2$ of the upper half 7 are jointed together in a smoothly bent configuration, whereby a flexible hose 21 made of rubber, synthetic resin or the like material is immovably held between the cutouts 20 formed on the upper end of the ribs $8_2$ and the lower surface of the upper half 7. One end of the hose 21 is connected to a nozzle tube $22_1$ of a cleaning nozzle 22 projecting inwardly of the central part of the rear wall $7_2$ of the upper half 7, whereas the other end of the same is connected to a cleaning liquid supply source P firmly mounted at a predetermined position on the car body while passing halfway through a hole 23 in the lefthand foot $8_4$ of the lower half 8, as well as through the gasket 12 and the second inclined air introduction surface 3.

A spraying port $22_2$ in communication with the nozzle tube $22_1$ is formed on the rear wall $7_2$ of the lower half 7 and it is oriented toward the upper surface of the rear windshield 6. As the cleaning liquid supplying source P is operated, cleaning water is supplied via the hose 21 and the nozzle tube $22_1$ to be sprayed toward the rear windshield 6 through the spraying port $22_2$. As will be apparent from the above description, any part of the hose 21 leading to the cleaning nozzle 22 is not exposed to the air introduction passage 5. Thus, there is no fear of lowering performance of the air flow control plate S due to the provision of the hose 21 and an elongated service life of the hose 21 is assured.

The rear window frame 4 is formed with a peripheral recess $4_1$ in the conventional manner so that the rear windshield 6 is secured to the rear window frame 4 with the aid of adhesive 25 which is filled in a space as defined by the peripheral recess $4_1$. A dam rubber 26 is fitted into a clearance between the lower surface of the rear windshield 6 and the bottom of the peripheral recess $4_1$ and lace 27 is fitted into a clearance between the peripheral edge of the rear windshield 6 and the peripheral wall surface of the recess $4_1$. It should be noted that by fixedly mounting the air flow control plate S on the rear window frame 4 after the rear windshield 6 is adhesively secured to the peripheral recess 41 it becomes possible to temporarily hold the rear windshield 6 via the lace 27 with the aid of the rear end part of the lefthand and righthand feet $8_4$ in place on the air flow control plate S as illustrated in FIGS. 5 to 7, with a result that the rear windshield 6 can be inhibited from moving loosely in its mounted position before the adhesive 25 is solidified. Therefore, the rear windshield 6 is not dislocated undesirably even when the rear gate Gr is opened by force upwardly before the adhesive 25 filled in the peripheral recess $4_1$ is solidified. Thus, there is no necessity for temporarily securing the rear windshield with the aid of specially designed clips which are conventionally used in this field of engineering, contributing reduction in cost.

Next, operation of the apparatus in accordance with this embodiment will be described below.

As a motorcar travels forward, a part of air flowing along the upper surface of the body roof 1 is introduced into the air introduction passage 5 past the first inclined air introduction surface 2 and thereafter it flows along the outer surface of the rear windshield 6 of the rear gate Gr to form a layer of clean air over the outer surface of the rear windshield 6. As air flows downwardly along the outer surface of the rear windshield 6, foreign material deposited on the latter such as mud, dust or the like which has been sprashed up by rear wheels is removed therefrom and moreover the layer of downwardly flowing clean air serves to inhibit foreign material such as mud, dust or the like from being newly deposited on the upper surface of the rear windshield 6.

While the cleaning liquid supply source P is operated, cleaning liquid is sprayed through the spraying port $2_{22}$ toward the upper surface of the rear windshield 6 at a properly determined downward inclination angle and thereby the upper surface of the rear windshield 6 can be cleaned effectively.

Incidentally, when it is assumed that air resistance during travelling of motorcar is represented by D, area projected on a plane standing upright in front of the motorcar is by A and resistance coefficient is by Cd, the following relation will be established.

$$D \approx Cd \cdot A$$

It will be readily understood from this relation that there is no fear of causing increase in air resistance D regardless of the arrangement of the air flow control plate S of the invention, as long as the projected area of motorcar as seen from the front side of the latter does not vary. Therefore, the air flow control plate S exhibits satisfactory result of cleaning function for the rear window without any increase in resistance against travelling of motorcar.

Since the roof of the car body is located flush with the upper surface of the rear window frame, placing or fitting of holder such as ski carrier or the like is easy to be achieved.

Further, since the air flow control plate S with a cleaning nozzle fitted thereto has no part projecting outwardly of the car body, there is no fear of degrading appearance of the whole motorcar.

Figure 10:
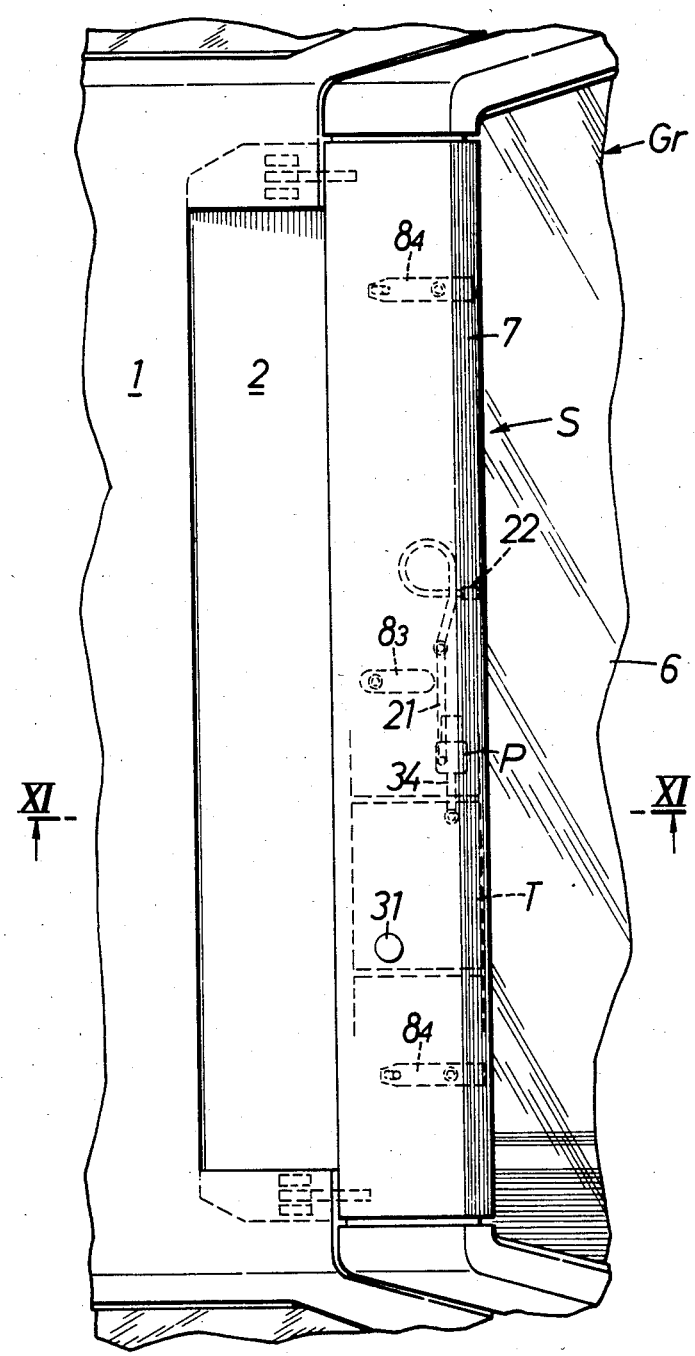
Figure 11:
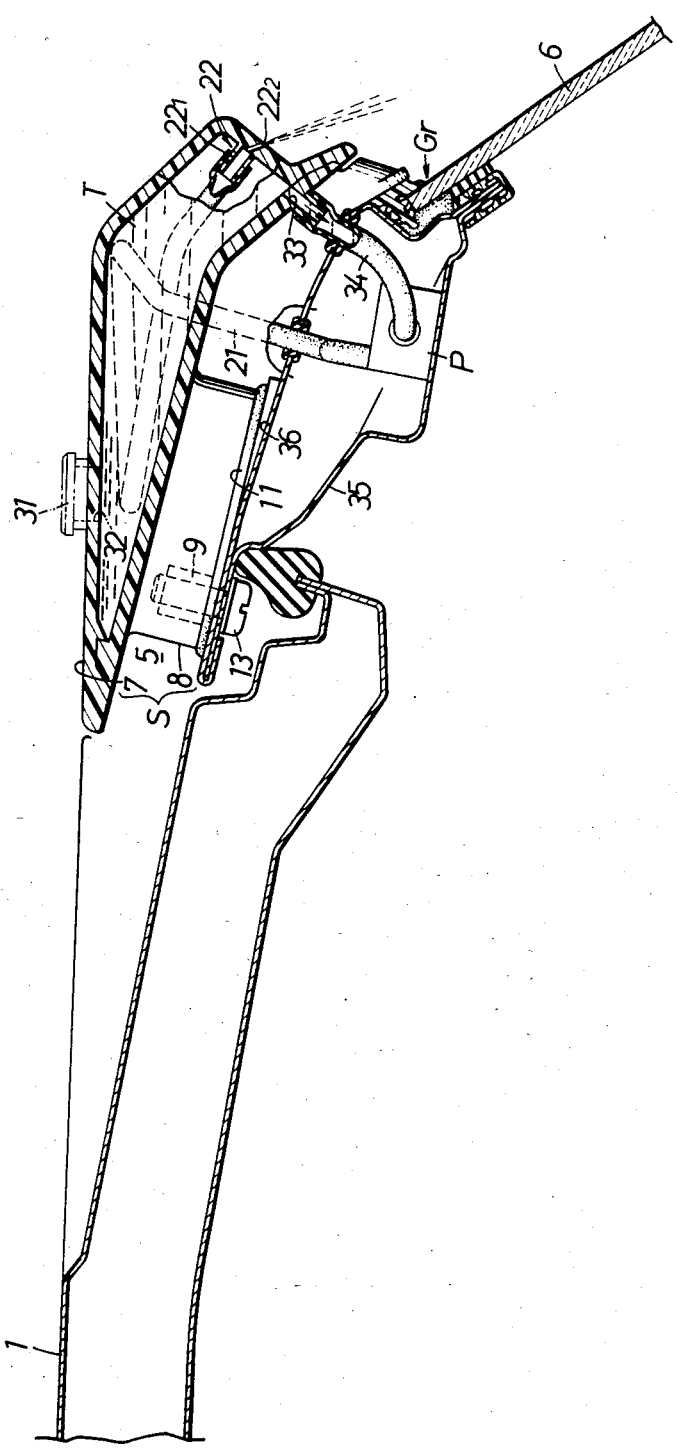

Next, description will be made as to an apparatus in accordance with the second embodiment of the invention with reference to FIGS. 10 and 11. This embodiment is characterized in that a part of the air flow control plate S is formed as a washer tank T for reserving cleaning liquid. Specifically, the washer tank T is constituted by a part of the space as defined between both the upper half 7 and the lower half 8. A liquid pouring port 32 adapted to be closed with a cap 31 is provided on an upper surface of the washer tank T, whereas a liquid draining port 33 is provided at one corner on the bottom of the same. A washer pump P serving as a cleaning liquid supply source is housed in a space defined by an upper panel 36 and an inner panel 35 located at the upper part of the rear gate Gr. A suction port of the washer pump P communicates with the liquid draining port 33 of the washer tank T via a conduit 34, whereas a delivery port of the same communicates with the cleaning nozzle 22 via hose 21. As the washer pump P is operated, cleaning liquid in the washer tank T is pumped up to the cleaning nozzle 22 via the hose 21 and it is then sprayed over the upper surface of the rear windshield 6 through the spraying port $22_2$ of the cleaning nozzle 22.

Incidentally, cleaning liquid pumped up from the washer pump P may be delivered to other area to be cleaned such as front windscreen or the like.

When a washer tank is constituted by at least a part of the air flow control plate in accordance with this embodiment, there is no necessity for mounting a washer tank in the form of a separate container in a space produced in the interior of a certain component such as bonnet, door, pillar or the like. As a result, the space occupied by the air flow control plate can be utilized effectively. Further, since the washer tank is disposed at the upper part of a motorcar and the washer pump is located below the washer tank, sufficiently high spraying pressure can be generated even when a motor of a small capacity is employed for operating the washer pump.

Moreover, since the cleaning nozzle is fitted to the air flow control plate, the washer pump can be connected to the cleaning nozzle via a hose having a very short length whereby mounting or fitting operation of these components becomes easy and only a short hose is required, further lowering the cost.

Next, FIGS. 12 and 13 illustrate a modified form of the means for firmly holding the cleaning hose 21 in the air flow control plate S. In this modified form, several holding pieces 40 with an inverted U-shaped recess 41 formed thereon, respectively, are projected downwardly from the joint section of the upper half 7 where the upper wall $7_1$ and the rear wall $7_2$ are jointed to each other in a smoothly curved configuration and they are located in a spaced relation in the transverse direction. On the other hand, a V-shaped recess 42 is formed on the upper end of each of the reinforcement ribs $8_2$ at a position located opposite to the corresponding holding piece 40. Thus, when the upper half 7 is superposed on the lower half 8, the cleaning hose 21 which is in communication with a cleaning nozzle can be immovably held between the inverted U-shaped recesses 41 of the holding pieces 40 and the V-shaped recesses 42 of the reinforcement ribs $8_2$.

Figure 14:
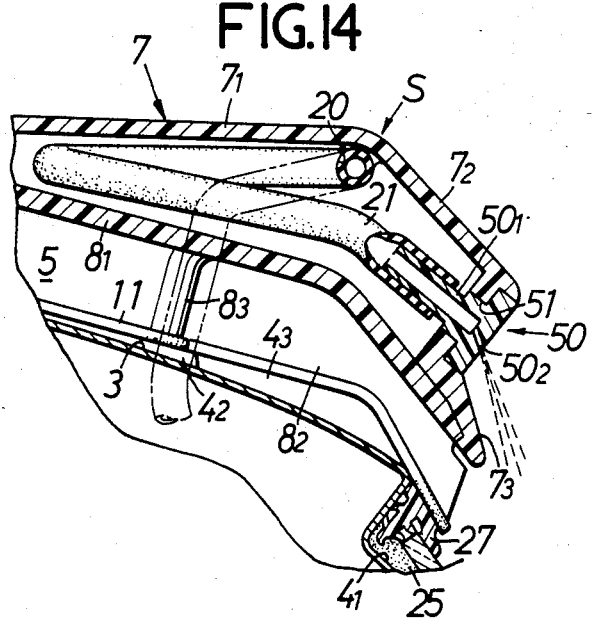
FIG. 14 is a fragmental sectional view of an air flow control plate with a cleaning nozzle fitted thereto in accordance with a modified form of the foregoing embodiments, shown in the same manner as in FIG. 5.

Finally, FIG. 14 illustrates a modified form of the cleaning nozzle. In this modified form, a cleaning nozzle 50 is formed separately from the air flow control plate S. The cleaning nozzle 50 includes a nozzle tube $50_1$ and a spraying port $50_2$ and it is fitted into a support hole 51 provided on the rear wall $7_2$ of the air flow control plate S.

While the present invention has been described with respect to preferred embodiments thereof, it should of course be understood that it should not be limited only to them but various changes or modifications may be made thereto in any acceptable manner without departure from the spirit and scope of the invention as defined by the appended claims.

What is claimed is:

1. An apparatus for inhibiting foreign material from being deposited on a rear window of a motorcar comprising a first inclined air introduction surface extending in a rearward and downward direction from a rear laterally middle part of an upper surface of a body roof, a second inclined air introduction surface formed on a laterally middle part of a rear window frame and extending rearwardly from said first inclined air introduction surface in a continuous and flush manner and an air flow control plate fixedly mounted on said second inclined air introduction surface on the rear window frame so as to allow air introduced into both the first and second inclined air introduction surfaces to flow along an upper surface of a rear windshield fitted to the rear window frame, said air flow control plate having an upper surface located flush with the upper surface of the body roof and an upper surface of the rear window frame, and having an upper half and a lower half, said lower half having a plurality of legs projecting downwardly from a lower surface thereof, said legs being fixedly secured to the second inclined air introduction surface.

2. An apparatus as defined in claim 1, wherein each of the legs has a rear end located on an upper end edge of the rear windshield so that the windshield is firmly held in place by the legs which serve as temporary holding member for the windshield.

3. An apparatus as defined in claim 1, wherein the air flow control plate is provided with cleaning means for cleaning the rear windshield fitted to the rear window frame.

4. An apparatus as defined in claim 3, wherein the cleaning means comprises a cleaning nozzle disposed on a rear wall of the upper half of the air flow control plate, said cleaning nozzle being directed toward the rear windshield fitted to the rear widow frame, a cleaning liquid supply source located at a predetermined position on the car body and a cleaning hose communicating between the cleaning nozzle and the cleaning liquid supply source.

5. An apparatus as defined in claim 4 wherein the air flow control plate comprises an upper half and a lower half which are connected with each other, said upper half comprising an upper wall extending flush with the upper surface of the body roof and upper surfaces of both lateral sides of the rear window frame located on both sides of the second inclined air introduction surface, a rear wall extending downwardly from a rear end of said upper wall via a bent portion while assuming a position flush with a rear surface of the rear window frame and a flange end extending from a rear end of said rear wall in parallel with an upper surface of the windshield fitted to the rear window frame, said lower half having a lower surface extending with a constant distance being provided from the first and second inclined air introduction surfaces to define an air introduction passage between the lower half and the first and second inclined air introduction surfaces.

6. An apparatus as defined in claim 4 or 5, wherein the cleaning nozzle of the cleaning means comprises a nozzle tube made integral with the rear wall of the upper half and projecting inwardly from the latter and a spraying port formed in the rear wall to communicate with said nozzle tube, one end of the cleaning hose being connected to the nozzle tube.

7. An apparatus as defined in claim 4 or 5, wherein the cleaning nozzle of the cleaning means is made separately from the air flow control plate and it is fitted into a support hole formed on the rear wall of the air flow control plate.

8. An apparatus as defined in claim 4, wherein the cleaning hose is firmly held between an upper half and a lower half both of which constitute the air flow control plate.

9. An apparatus as defined in claim 5, wherein the cleaning hose is firmly held between the upper half and the lower half of the air flow control plate.

10. An apparatus as defined in claim 8 or 9, wherein the lower half is provided with a plurality of reinforcement ribs upstanding on an upper surface thereof which are arranged in a transversely spaced relation from each other, the cleaning hose being firmly held between cutouts formed on upper edges of some of the reinforcement ribs and lower surface of the upper half.

11. An apparatus as defined in claim 8 or 9, wherein the lower half is provided with a plurality of reinforcement ribs upstanding on an upper surface thereof which are arranged in a transversely spaced relation from each other, some of said reinforcement ribs being formed with holding recesses on upper edges thereof, and the upper half is provided with a plurality of holding pieces projecting downwardly from lower surface thereof at positions correspondingly to the holding recesses, said holding pieces being formed with recesses, the cleaning hose being firmly held between the holding recesses on the reinforcement ribs and the recesses on the holding pieces.

12. An apparatus as defined in claim 4 or 5, wherein the cleaning means further includes a washer tank for reserving cleaning liquid, said washer tank being in communication with the cleaning liquid supply source via a conduit.

13. An apparatus as defined in claim 12, wherein the washer tank is mounted on the car body at a position exclusive the air flow control plate.

14. An apparatus as defined in claim 12, wherein the washer tank is formed by utilizing an interior space of the air flow control plate.

15. An apparatus as defined in claim 12, wherein the washer tank is mounted at a position higher than that of the cleaning liquid supply source.

16. An apparatus for inhibiting foreign material from being deposited on a rear window of a motorcar comprising a first inclined air introduction surface extending in a rearward and downward direction from a rear laterally middle part of an upper surface of a body roof, a second inclined air introduction surface formed on a laterally middle part of a window frame fitted to a rear gate on a car body and extending rearwardly from said first inclined air introduction surface in a continuous and flush manner and an air flow control plate fixedly mounted on said second inclined air introduction surface on the window frame so as to allow air introduced into both the first and second inclined air introduction surfaces to flow along an upper surface of a windshield fitted to the window frame, said air flow control plate having an upper surface located flush with the upper surface of the body roof and an upper surface of the window frame, said rear gate being turnably supported on the car body by means of hinge members disposed on both lateral sides of the first inclined air introduction surface, and said hinge members being covered with hinge covers located flush with the upper surface of the body roof.

17. An apparatus as defined in claim 16, wherein the air flow control plate comprises an upper half and a lower half both of which are molded of synthetic resin.

18. An apparatus as defined in claim 17, wherein the lower half has a plurality of legs projecting downwardly from a lower surface thereof, said legs being fixedly secured to the second inclined air introduction plate.

19. An apparatus as defined in claim 16, wherein the rear end of the legs has a rear end located on an upper end edge of the windshield so that the windshield is firmly held in place by the legs which serve as temporary holding means for the windshield.

20. An apparatus as defined in claim 16, wherein the air control plate is provided with cleaning means for cleaning the windshield fitted to the rear gate.

21. An apparatus as defined in claim 20, wherein the cleaning means comprises a cleaning nozzle disposed on a rear wall of the upper half of the air flow control plate, said cleaning nozzle being directed toward the windshield fitted to the rear gate, a cleaning liquid supply source located at a predetermined position on the car body and a cleaning hose communicating between the cleaning nozzle and the cleaning liquid supply source.

22. An apparatus as defined in claim 21, wherein the air flow control plate comprises an upper half and a lower half which are connected with each other, said upper half comprising an upper wall extending flush with the upper surface of the body roof and upper surfaces of both lateral sides of the window frame of the rear gate located on both sides of the second inclined air introduction surface, a rear wall extending downwardly from a rear end of said upper wall via a bent portion while assuming a position flush with a rear surface of the window frame and a flange end extending from a rear end of said rear wall in parallel with an upper surface of the windshield of the window frame, said lower half having a lower surface extending with a constant distance being provided from the first and second inclined air introduction surfaces to define an air introduction passage between the lower half and the first and second inclined air introduction surfaces.

23. An apparatus as defined in claim 21 or 22, wherein the cleaning nozzle of the cleaning means comprises a nozzle tube made integral with the rear wall of the upper half and projecting inwardly from the latter and a spraying port formed in the rear wall to communicate with said nozzle tube, one end of the cleaning hose being connected to the nozzle tube.

24. An apparatus as defined in claim 21 or 22, wherein the cleaning nozzle of the cleaning means is made separately from the air flow control plate and it is fitted into a support hole formed on the rear wall of the air flow control plate.

25. An apparatus as defined in claim 21, wherein the cleaning hose is firmly held between an upper half and a lower half both of which constitute the air flow control plate.

26. An apparatus as defined in claim 21, wherein the cleaning hose is firmly held between the upper half and the lower half of the air flow control plate.

27. An apparatus as defined in claim 25 or 26, wherein the lower half is provided with a plurality of reinforcement ribs upstanding on an upper surface thereof which are arranged in a transversely spaced relation from each other, the cleaning hose being firmly held between cutouts formed on upper edges of some of the reinforcement ribs and lower surface of the upper half.

28. An apparatus as defined in claim 25 or 26, wherein the lower half is provided with a plurality of reinforcement ribs upstanding on an upper surface thereof which are arranged in a transversely spaced relation from each other, some of said reinforcement ribs being formed with holding recesses on upper edges thereof, and the upper half is provided with a plurality of holding pieces projecting downwardly from lower surface thereof at positions correspondingly to the holding recesses, said holding pieces being formed with recesses, the cleaning hose being firmly held between the holding recesses on the reinforcement ribs and the recesses on the holding pieces.

29. An apparatus as defined in claim 21 or 22, wherein the cleaning means further includes a washer tank for reserving cleaning liquid, said washer tank being in communication with the cleaning liquid supply source via a conduit.

30. An apparatus as defined in claim 29, wherein the washer tank is mounted on the car body at a position exclusive the air flow control plate.

31. An apparatus as defined in claim 29, wherein the washer tank is formed by utilizing an interior space of the air control plate.

32. An apparatus as defined in claim 29, wherein the washer tank is mounted at a position higher than that of the cleaning liquid supply source.

33. An apparatus as defined in claim 1, wherein the air flow plate is molded of synthetic resin.

* * * * *